United States Patent

Emenhiser

(10) Patent No.: US 6,706,197 B2
(45) Date of Patent: Mar. 16, 2004

(54) METHOD FOR REDUCING PHOSPHORUS IN A BODY OF WATER

(75) Inventor: Thomas Emenhiser, Wellington, FL (US)

(73) Assignee: Palm Beach Aggregates, Inc., Loxahatchee, FL (US)

( * ) Notice: Subject to any disclaimer, the term of this patent is extended or adjusted under 35 U.S.C. 154(b) by 192 days.

(21) Appl. No.: 10/041,138

(22) Filed: Jan. 7, 2002

(65) Prior Publication Data

US 2003/0127397 A1 Jul. 10, 2003

(51) Int. Cl.$^7$ .................................................. C02F 1/52
(52) U.S. Cl. .................. 210/716; 210/718; 210/724; 210/737; 210/747; 210/906; 252/175; 423/175; 423/637; 423/640
(58) Field of Search .......................... 210/702, 716, 210/718, 724, 737, 743, 747, 906; 423/175, 637, 640; 252/175

(56) References Cited

U.S. PATENT DOCUMENTS

| | | | |
|---|---|---|---|
| 4,017,391 A | * 4/1977 | Black | 210/705 |
| 4,031,183 A | * 6/1977 | Rourke | 423/175 |
| 4,320,012 A | 3/1982 | Palm et al. | 210/713 |
| 4,596,661 A | * 6/1986 | Gill et al. | 210/728 |
| 4,698,163 A | 10/1987 | Zibrida | 210/713 |
| 4,707,270 A | * 11/1987 | Kobayashi et al. | 210/683 |
| 4,707,350 A | * 11/1987 | Baudequin et al. | 423/637 |
| 4,966,714 A | * 10/1990 | Hirosawa et al. | 210/708 |
| 5,965,103 A | * 10/1999 | Golley et al. | 423/640 |
| 5,993,649 A | 11/1999 | DeBusk et al. | 210/97 |

* cited by examiner

*Primary Examiner*—Peter A. Hruskoci
(74) *Attorney, Agent, or Firm*—Carlton Fields, P.A.

(57) ABSTRACT

This invention provides a method for reducing phosphorous in a body of water. This method comprises calcining a plurality of rocks and collecting carbon dioxide formed as a result of the calcining process; crushing the plurality of calcined rocks; pumping source water from the body of water into to a plurality of retaining cells; flocculating the phosphorus in the source water by introducing the plurality of calcined rocks into the source water in the retaining cells; settling out a phosphorous precipitate formed by the flocculating act; adjusting the pH level of the flocculated source water to a predetermined range of values by pumping carbon dioxide created by the calcining of the rocks into the source water to created treated water; and transferring the treated water back to the body of water.

12 Claims, 2 Drawing Sheets

METHOD FOR REDUCING PHOSPHORUS IN A BODY OF WATER

BACKGROUND OF THE INVENTION

This invention relates generally to the removal of pollutants from water, and more particularly to a method for reducing phosphorous in a body of water.

Phosphorous concentrations in bodies of water throughout the United States, and specifically South Florida, have dramatically increased over the past thirty years. These changes, as documented in numerous scientific reports and articles, have caused heightened concern regarding the overall ecological health of these bodies of water. Due to these concerns, lawmakers at the federal and state level have passed legislation that requires the level of phosphorous be reduced enormously, sometimes as high as an eighty percent reduction of phosphorous.

There is, then, a need to reduce phosphorous concentrations in bodies of water without further injuring the ecosystems in which those bodies of water are located. Preferably, a method needed to reduce phosphorous concentrations can utilize existing resources near the body of water. Prior attempts have been made to effectively reduce the amount of phosphorous in water. However, these attempts are either impractical, difficult to perform, or do not promote the health of the ecosystem of the body of water. Therefore, a method for reducing phosphorous concentrations in bodies of waters is needed.

SUMMARY OF THE INVENTION

This invention provides a method for reducing phosphorous in a body of water. This method comprises calcining a plurality of rocks and collecting carbon dioxide formed as a result of the calcining process; crushing the plurality of calcined rocks; pumping source water from the body of water into to a plurality of retaining cells; flocculating the phosphorus by introducing the plurality of calcined rocks into the source water in the retaining cells; settling out a phosphorous precipitate formed by the flocculating act; adjusting the pH level of the flocculated source water to a predetermined range of values by pumping carbon dioxide created by the calcining of the rocks into the source water to created treated water; and transferring the treated water back to the body of water.

DESCRIPTION OF PREFERRED EMBODIMENTS

Figure 1:
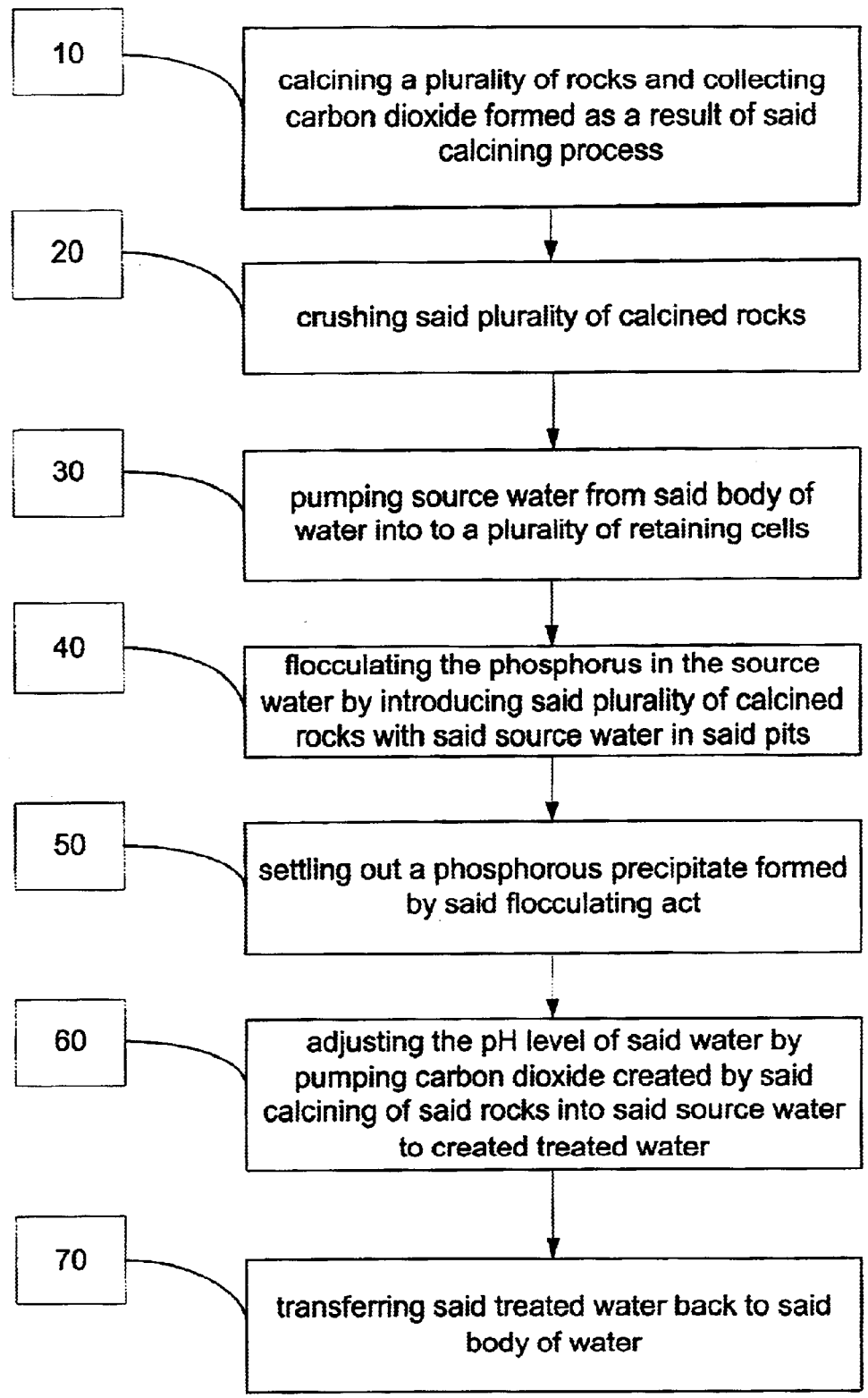
FIG. 1 is a flow chart illustrating a preferred method of this invention.

Particularly preferred embodiments of the present invention are illustrated in the drawings, which illustrate a preferable method for reducing phosphorous in a body of water. FIG. 1 illustrates a preferred embodiment of a method of this invention. A first step is suitably step 10 of calcining a plurality of rocks. Preferably, these rocks are lime rock containing calcium carbonate ($CaCO_3$) and having about twenty-two percent (22%) calcium by weight. Preferably, the act of calcining is performed by heating the rocks in a natural gas kiln for about three hours at a temperature of about 1,850° F. The heating causes the calcium carbonate to separate into calcium oxide and carbon dioxide:

$$CaCO_3 + Heat \rightarrow CaO + CO_2$$

Another step is suitably step 20 of crushing the calcined rocks to create a larger surface area of calcined rock. Suitably, the rock may be crushed to the sizes referred to as pea rock or rice rock. Crushing the calcined rock also enables the calcined rock to conveniently be mixed with water to form a slurry containing about ten percent (10%) to about twenty percent (20%) calcined rock.

Preferably, another step is the step 30 of pumping source water from the body of water to a plurality of retaining cells, suitably in the form of excavated rock pits. In one preferred embodiment, the source water contains a concentration of phosphorous ranging from about 100 μg/L and higher. Conveniently, the retaining cells may be flocculating cells.

Another step is suitably step 40 of flocculating the phosphorus in the source water by introducing the calcined rocks into the source water to create a phosphorous precipitate. In this embodiment the calcined rock may be added at the rate of about 200 mg per liter of source water. The calcium oxide created during the calcining process first reacts with water molecules in the source water:

$$CaO + H_2O \rightarrow Ca(OH)_2$$

The calcium hydroxide frequently disperses into a divalent calcium cation ($Ca^{2+}$) and two monovalent hydroxide anions ($OH^-$). The divalent calcium cations now in the source water react with free phosphate to create calcium phosphate, which is a precipitate that may be settled out of the source water:

$$Ca^{2+} + PO_4^{2-} \rightarrow CaPO_4(\downarrow)$$

Conveniently, another step is suitably step 50 of settling the phosphorous precipitate formed by the flocculating act. Preferably, the source water is transferred to a settling cell for the settling process, and the settling cell is suitably about one hundred (100) acres in surface area. In one preferred embodiment, the settling act causes the concentration of phosphorous to drop to a range of between 10 μg/L to 15 μg/L.

Suitably, the source water is transferred from the settling cell to an about eighty (80) acre surface area polishing cell. Conveniently, another step is the step 60 of adjusting the pH level to a predetermined range of values by pumping the carbon dioxide collected from the calcining process. Upon proper adjusting, the source water is treated water. During the settling of the phosphorous, the pH of the source water rises to a range of about 9.0 to about 9.5. This is not the native pH of the body of water. By adding carbon dioxide, carbonic acid is created:

$$CO_2 + H_2O \rightarrow H_2CO_3$$

Carbonic acid sometimes separates into a univalent hydrogen cation ($H^+$) and a univalent bicarbonate anion ($HCO_3^-$). The free hydrogen cations combine with the free hydroxide anions formed by the separation of the calcium hydroxide created by the reaction of calcium oxide with water described above, and the free calcium cations combine with the free bicarbonate anions to form calcium bicarbonate:

$$H^+ + OH^- \rightarrow H_2O$$

$$Ca^{2+} + HCO_3^- \rightarrow CaHCO_3 \text{ (unbalanced equation)}$$

Calcium bicarbonate is soluble in water, and it is frequently found in nature. Therefore, the formation of calcium bicarbonate is not harmful to the ecosystem of the body of water. After the pH is properly adjusted, suitably to a range of between about 6.5 and 8.0, another step is preferably the step 70 of transferring the treated water back to the body of water.

Figure 2:
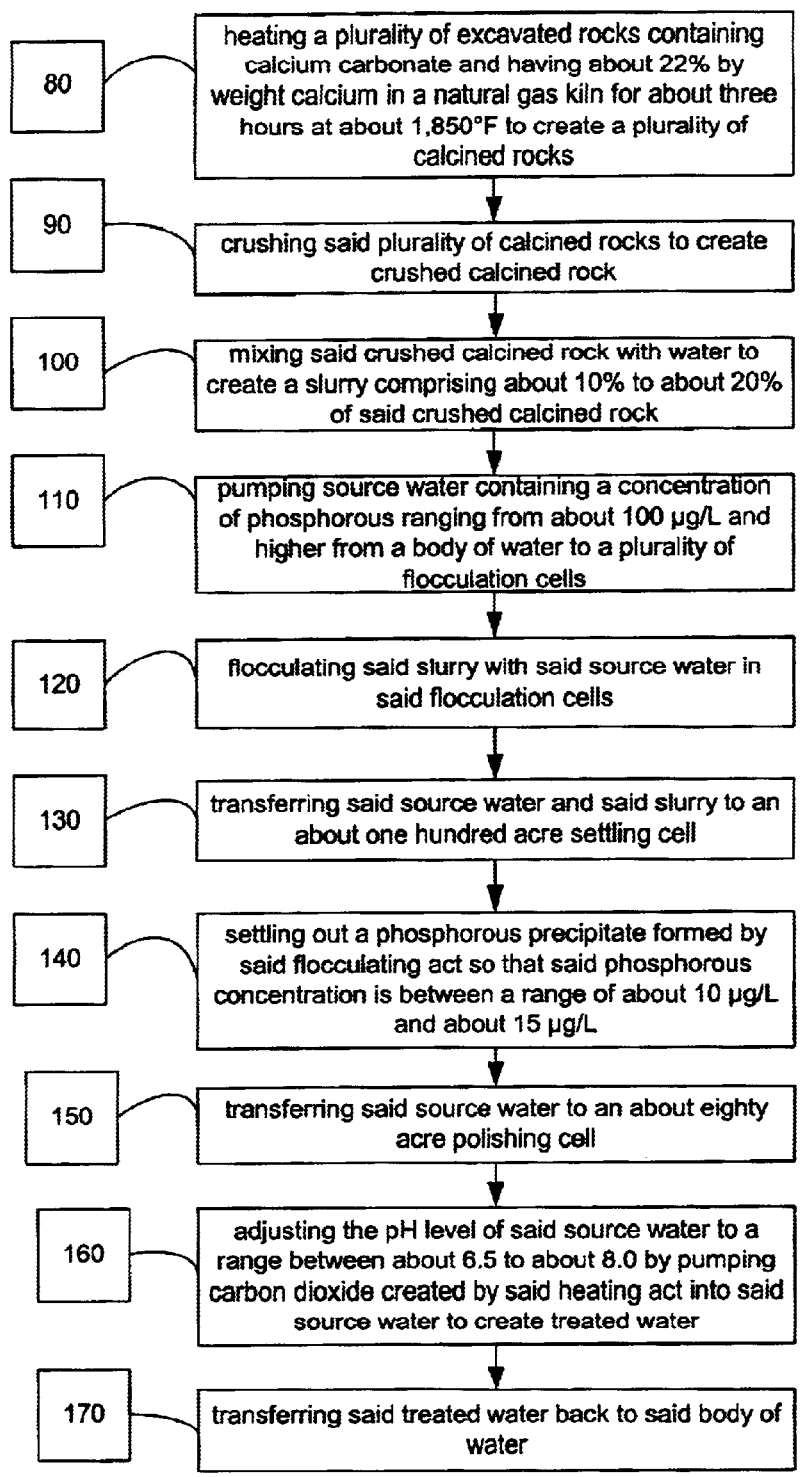
FIG. 2 is a flow chart illustrating a preferred method of this invention.

FIG. 2 illustrates another preferred embodiment of the present invention. A step 80 is preferably heating a plurality of excavated rocks containing calcium carbonate and having about 22% by weight calcium in a natural gas kiln for about three hours at about 1,850° F. to create a plurality of calcined rocks. Suitably, another step is the step 90 of crushing the plurality of calcined rocks to create crushed calcined rock. Another step is suitably the step 100 of mixing the crushed calcined rock with water to create a slurry comprising about 10% to about 20% of the crushed calcined rock.

Another step is suitably the step 110 of pumping source water containing a concentration of phosphorous ranging from about 100 µg/L and higher from a body of water to a plurality of flocculation cells. Suitably, another step is the step 120 of flocculating the slurry with the source water in the flocculation cells.

Another step is suitably the step 130 of transferring the source water and the slurry to a settling cell of about one hundred acres. There, another step is suitably the step 140 of settling out a phosphorous precipitate formed by the flocculating act so that the phosphorous concentration is between a range of about 10 µg/L and about 15 µg/L.

Suitably, two additional steps are step 150 of transferring the source water to an about eighty acre polishing cell and step 160 of adjusting the pH level of the source water to a range between about 6.5 to about 8.0 by pumping carbon dioxide created by the heating act into the source water to create treated water. Another step is suitably the step 170 of transferring the treated water back to the body of water.

While the foregoing describes a particularly preferred embodiment of the present invention, it is to be understood that numerous modifications and variations of the process, all within the scope of the invention, will readily occur to those skilled in the art. Accordingly, the scope of this invention is to be limited solely by the claims appended hereto.

What is claimed is:

1. A method for reducing phosphorous in a body of water, comprising the acts of:
    calcining a plurality of rocks containing calcium carbonate to convert said calcium carbonate to calcium oxide, and collecting carbon dioxide formed as a result of said calcining process;
    crushing said plurality of calcined rocks;
    pumping source water from said body of water into to a plurality of retaining cells;
    flocculating said phosphorus by introducing said plurality of calcined rocks into said source water in said retaining cells;
    settling out a phosphorous precipitate formed by said flocculating act; adjusting the pH level of said flocculated source water to a predetermined range of values by pumping said carbon dioxide created by said calcining of said rocks into said source water to create treated water; and
    transferring said treated water back to said body of water.

2. The method according to claim 1, wherein said calcining act comprises the act of heating excavated rock containing calcium carbonate and having about 22% calcium by weight for about three hours at about 1,850° F. to convert said calcium carbonate to calcium oxide.

3. The method according to claim 1, wherein said calcining act is performed in a natural gas kiln.

4. The method of claim 1, further comprising the act of mixing said crushed calcined rock with said source water to create a slurry comprising about 10% to about 20% of said crushed calcined rock.

5. The method according to claim 1, wherein said pumping act comprises pumping said source water to a plurality of flocculation cells.

6. The method of claim 1, further comprising the act of transferring said source water from said retaining cell to a settling cell after said flocculating act.

7. The method of claim 6, wherein said settling cell is about one hundred acres in surface area.

8. The method according to claim 1, further comprising the act of transferring said flocculated source water to a polishing cell after said settling act.

9. The method according to claim 8, wherein said polishing cell is about eighty acres in surface area.

10. The method of claim 1, wherein said settling act reduces phosphorous in said source water from concentrations of about 100 µg/L and higher to a range of about 10 µg/L to about 15 µg/L.

11. The method of claim 1, wherein said adjusting act adjusts the pH level of said source water to a range between about 6.5 to about 8.0 to create said treated water.

12. A method for removing phosphorous from water, comprising the acts of:
    heating a plurality of excavated rocks containing calcium carbonate and having about 22% by weight calcium in a natural gas kiln for about three hours at about 1,850° F. to create a plurality of calcined rocks;
    crushing said plurality of calcined rocks to create crushed calcined rock;
    mixing said crushed calcined rock with water to create a slurry comprising about 10% to about 20% of said crushed calcined rock;
    pumping source water containing a concentration of phosphorous ranging from about 100 µg/L and higher from a body of water to a plurality of flocculation cells;
    flocculating said slurry with said source water in said flocculation cells; transferring said source water and said slurry to a settling cell;
    settling out a phosphorous precipitate formed by said flocculating act so that said phosphorous concentration is between a range of about 10 µg/L and about 15 µg/L;
    transferring said flocculated source water to a polishing cell;
    adjusting the pH level of said flocculated source water to a range between about 6.5 to about 8.0 by pumping carbon dioxide created by said heating act into said source water to create treated water; and
    transferring said treated water back to said body of water.

* * * * *